Dec. 19, 1967 R. A. PETELINKAR 3,359,186
DISTILLATION OF DIMETHYLCHLOROSILANE IN PRESENCE OF ADDED HCl
Filed July 31, 1964
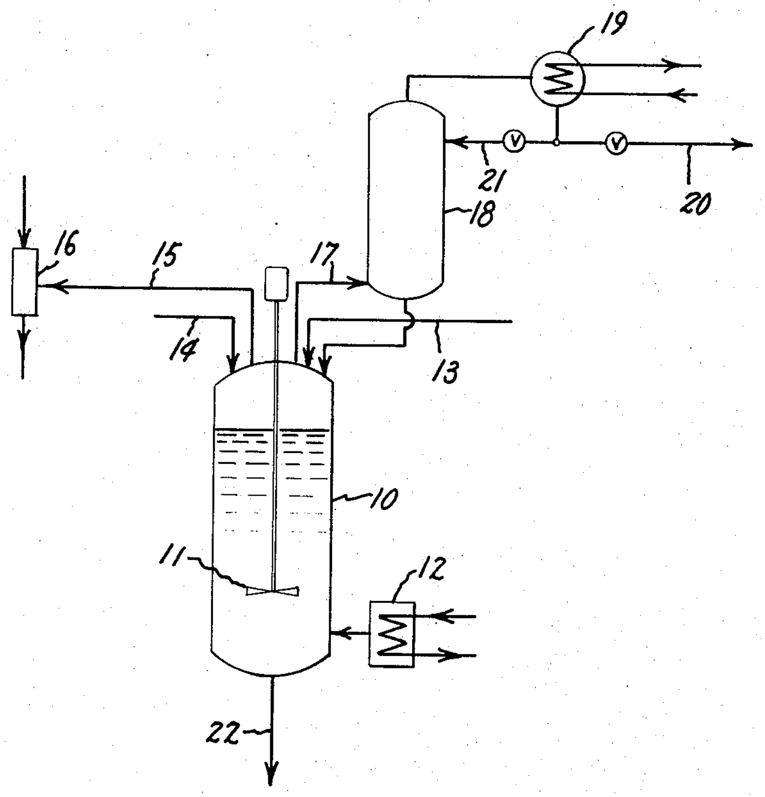
Inventor:
Richard A Petelinkar,
by William A Teoli
His Attorney.

3,359,186
Patented Dec. 19, 1967

1

3,359,186

DISTILLATION OF DIMETHYLCHLOROSILANE IN PRESENCE OF ADDED HCl

Richard A. Petelinkar, Latham, N.Y., assignor to General Electric Company, a corporation of New York Filed July 31, 1964, Ser. No. 386,761
4 Claims. (Cl. 203—34)

ABSTRACT OF THE DISCLOSURE

A method is provided for recovering dimethylchlorosilane substantially free of hydrocarbon contamination from crude chlorosilane resulting from the reaction of heated silicon powder and methylchloride. Contamination of chlorosilane with hydrocarbon results from free radical degradation during the reaction between powdered silicon and methylchloride. Treatment of the crude chlorosilane with hydrogen chloride has been found to provide for the recovery of the dimethylchlorosilane free of hydrocarbon contamination.

The present invention relates to a method for recovering dimethylchlorosilane from crude chlorosilane mixtures resulting from the reaction of powdered silicon and methyl chloride.

Methods for making dimethylchlorosilane are constantly being developed by the organosilicon industry because of the increasing importance of this valuable intermediate. One method that can be employed for making dimethylchlorosilane is by partially reducing dimethyldichlorosilane. For example, in copending applications of A. Berger, Ser. Nos. 332,911 and 332,860 filed Dec. 23, 1963, and assigned to the same assignee as the present invention, there are taught methods of effecting the partial reduction of diorganodihalosilane with alkali borohydrides in combination with certain organic solvents. Although these methods provide for effective results, they require the employment of expensive reagents and valuable materials as reactants, such as dimethyldichlorosilane.

As taught by E. G. Rochow, Chemistry of the Silicones, 2nd edition, John Wiley and Sons, New York, p. 37, silicon hydrides can be formed along with a variety of other organohalosilanes by the direct method involving the reaction of silicon and organic halides in the presence of a copper catalyst. As a result of side reactions such as free radical degradation other products such as hydrocarbons also form. Experience has shown that fractional distillation of the crude chlorosilane mixture can provide for the separation of chlorosilane containing as high as 95% by weight of dimethylchlorosilane. It has been found however, that the utility of the dimethylchlorosilane obtained in this manner is substantially reduced; it is contaminated with hydrocarbons having about the same boiling point. For example, the employment of such contaminated dimethylchlorosilane in conventional silicon hydride addition reactions results in a substantial reduction in rate of reaction as well as yields of desired product. In addition, after the silicon hydride adduct has been recovered from the reaction mixture, attempts to reuse the unreacted dimethylchlorosilane is complicated by the build-up in weight percent of the hydrocarbon contaminant.

As employed hereinafter, the expression "crude chlorosilane mixture" signifies product derived from the reaction of silicon powder and methyl chloride having at least 10% by weight of dimethylchlorosilane based on the weight of chlorosilane. The expression of "hydrocarbon contaminant" refers to hydrocarbon produced during the reaction between methyl chloride and silicon powder in the presence of a metal catalyst, as a result of free radical degradation.

2

The present invention is based on the discovery that dimethylchlorosilane virtually free of hydrocarbon contaminant can be recovered by fractional distillation of crude chlorosilane mixture initially having as little as 10% by weight of dimethylchlorosilane by treating the crude chlorosilane mixture with hydrogen chloride. The dimethylchlorosilane can be readily distilled from the treated product at a temperature between 34° C. to 36° C.

In accordance with the present invention, there is provided a method for recovering dimethylchlorosilane from the chlorosilane reaction product of powdered silicon and methyl chloride comprising at least 10% by weight of chlorosilane of dimethylchlorosilane which comprises (1) contacting said chlorosilane reaction product with hydrogen chloride to produce a mixture having at least .01 part of hydrogen chloride, per part of said chlorosilane reaction product, (2) distilling the product of (1) to a temperature up to 41° C. and (3) recovering from (2) product boiling between 34° C. to 36° C.

Generally, any crude chlorosilane mixture containing dimethylchlorosilane produced by the reaction of powdered silicon and methyl chloride can be treated by the method of the invention. For example, Schubert et al. Patent 2,563,557, assigned to the same assignee as the present invention, shows a crude chlorosilane mixture, having a boiling range between about 26° C. to about 41° C. It can include for example, silicon tetramethyl, trichlorosilane, methyldichlorosilane, dimethylchlorosilane, etc. This crude chlorosilane mixture can be obtained by the passage of methyl chloride over heated silicon in the presence of a catalyst such as shown in Rochow Patent 2,380,995, issued Aug. 7, 1945 and assigned to the same assignee as the present invention.

In accordance with the practice of the invention, a crude chlorosilane mixture containing at least 10% by weight of dimethylchlorosilane is treated with anhydrous hydrogen chloride. The treated product is distilled; a fraction boiling between 34° C.–36° C. is recovered.

The preferred method of practicing the present invention is further illustrated by the attached drawing, where 10 is a high pressure vessel having an agitator 11 and a heat exchanger 12, 13 is a line for introducing crude chlorosilane, and 14 is a line for introducing anhydrous hydrogen chloride under pressure. After the chlorosilane has been sufficiently agitated, anhydrous hydrogen chloride is vented at line 15 to a scrubber 16. The treated chlorosilane is then distilled from 10 and distillate is fed above through line 17 to column 18 and refluxed. Take off substantially free of hydrocarbon contaminate and boiling at temperatures up to 70° C. at atmospheric pressure can be recovered by means of condenser 19 through line 20. Higher boilers can be returned through line 21. Direct recovery of dimethylchlorosilane substantially free of hydrocarbon contamination can be effected at line 20 without further distillation, depending upon its initial weight percent in the chlorosilane crude, or the purity desired. Alternatively, the take off at line 20 can be further distilled to provide for recovery of product boiling between 34°–36° C. at atmospheric pressure.

In treating the crude chlorosilane mixture with hydrogen chloride, any one of a variety of procedures can be utilized. Preferably, the crude chlorosilane mixture is contacted with anhydrous hydrogen chloride at above atmospheric pressure. The introduction of gaseous anhydrous hydrogen chloride into the liquid chlorosilane mixture under sealed conditions can be continued until pressures up to 1100 p.s.i.g. are obtained at temperatures above 0° C.

When operating under atmospheric pressures or below, experience has shown that effective results can be achieved at temperatures up to the reflux temperature of the crude chlorosilane mixture. Contact between the anhydrous hydrogen chloride and the crude chlorosilane mixture can be effected in the gaseous phase. In instances where contact is effected between gaseous anhydrous hydrogen chloride and crude chlorosilane in the liquid phase, it has been found desirable to effect contact at a temperature between −20° C. to 30° C. to provide for a concentration of at least .01 part of hydrogen chloride per part of chlorosilane.

Under most situations, a temperature of at least 0° C. and preferably between 0° C. to 50° C. is employed, while a temperature as high as 150° C. can be utilized to provide for effective results. Reaction times can vary between 0.5 hours or less, to 100 hours or more depending upon such conditions as pressure, concentration of hydrogen chloride, temperature, etc. Preferably a concentration of from .01 to 0.5 part of hydrogen chloride per part of crude chlorosilane mixture is utilized, while as high as 10 parts of hydrogen chloride per part of mixture can be employed, if desired.

In order that those skilled in the art will be better able to practice the invention, the following examples are given by way of illustration and not by way of limitation. All parts are by weight.

*Example 1*

Anhydrous hydrogen chloride is introduced into a closed system containing a crude chlorosilane mixture. A mass spectrometer shows the mixture consists of about 45% by weight of silicon tetramethyl, about 12% by weight of trichlorosilane, about 31% by weight of dimethylchlorosilane and about 12% by weight of methyltrichlorosilane based on the weight of chlorosilane; it is contaminated with about 15% by weight of the mixture of hydrocarbon contaminant. The mixture is agitated at atmospheric temperatures for four hours while a pressure of 40 p.s.i.g. is maintained in the system. The mixture is then distilled at atmospheric pressure and a fraction is collected at a temperature between 34° C. to 36° C. The product is analyzed with a mass spectrometer; it is found to contain greater than 98% by weight of dimethylchlorosilane and less than 2% by weight of hydrocarbon contaminant.

A sample of the same crude chlorosilane mixture is directly distilled following the same distillation procedure without treating it with anhydrous hydrogen chloride. A fraction boiling between 34° C. to 36° C. is collected. A mass spectrometer shows that distillation of the untreated crude chlorosilane mixture results in the production of product having about 13% by weight of hydrocarbon contaminant.

*Example 2*

A gaseous mixture of anhydrous hydrogen chloride and crude chlorosilane was passed into a condensation zone at a temperature between about −20° C. to about 25° C. This gaseous mixture consisted of about 2 parts of hydrogen chloride per part of chlorosilane.

The gaseous mixture was formed by bubbling anhydrous hydrogen chloride into a crude chlorosilane mixture refluxing under atmospheric conditions until the mixture became saturated with hydrogen chloride. The crude chlorosilane mixture consisted of about 87% by weight of dimethylchlorosilane, about 12% by weight of hydrocarbon contaminant and minor amounts of silane, trichlorosilane and methyldichlorosilane. The effluent was passed through the above-described condensation zone which was at an initial contact temperature of about 25° C. and a terminal separation temperature of −20° C. to provide the complete recovery of treated chlorosilane.

A sample of condensate showed that it contained greater than 98.5% chlorosilane based on mass spectrometer analysis. This sample was distilled and a fraction was recovered boiling between 34° C. and 36° C. Based on mass spectrometer analysis, the resulting product was dimethylchlorosilane having a purity of about 98.7%.

*Example 3*

Anhydrous hydrogen chloride is introduced into a chlorosilane mixture consisting of about 11% by weight of dimethylchlorosilane, 82% by weight of methyldichlorosilane, and 7% by weight of silicon tetramethyl based on the total weight of chlorosilane; the chlorosilane mixture also contains about 6% by weight of hydrocarbon contaminant. The resulting mixture is heated for a period of 12 hours under sealed conditions at a temperature of 25° C. and at a pressure of 50 p.s.i.g. The mixture is distilled, and a fraction, A, boiling between 34° C. to 36° C. is recovered.

The same procedure is repeated except nitrogen is passed into the mixture instead of hydrogen chloride. This mixture is also distilled and a fraction, B boiling between 34° C. to 36° C. is received. Fractions A and B are analyzed with a mass spectrometer. It is found that fraction A, treated with anhydrous hydrogen chloride, contains greater than 98% dimethylchlorosilane; the nitrogen treated chlorosilane fraction B, is found to be contaminated with more than 10% by weight of hydrocarbon based on the total weight of chlorosilane and hydrocarbon.

Equal moles of dimethylchlorosilane obtained from fraction A and 1-pentene are reacted in a closed system in the presence of a platinum catalyst at a temperature between 100° C. and 110° C. The dimethylchlorosilane is added to a mixture of 1-pentene and approximately 0.1% by weight of 1-pentene, of a platinum catalyst. The same procedure is repeated with dimethylchlorosilane obtained from fraction B.

Table I below shows the results obtained in which reaction time in minutes indicates the amount of time it takes to complete the above addition reactions, utilizing dimethylchlorosilane obtained from fraction A, as compared to B. In addition, yield of dimethylpenytlchlorosilane resulting from the addition of the dimethylchlorosilane and 1-pentene, also is indicated.

TABLE I

| | Reaction Times (mins.) | Yield (percent) |
|---|---|---|
| A | 8 | 86 |
| B | 90 | 77 |

*Example 4*

A crude chlorosilane mixture consisting of 86.8% by weight of dimethylchlorosilane, 11.5% of hydrocarbon contaminant, 1.2% of trichlorosilane, 0.1% of silane and 0.4% of methyldichlorosilane was charged to a closed vessel. Anhydrous hydrogen chloride was then introduced into the crude chlorosilane mixture at a rate sufficient to provide for a pressure of between about 7 p.s.i.g. to 23 p.s.i.g. at a temperature between 0 to 10° C. During the course of the reaction, samples of the chlorosilane mixture were removed and distilled; product boiling between 34° C.–36° C. was analyzed with a mass spectrometer.

Table II shows the change in weight percent of dimethylchlorosilane in the product boiling between 34° C.–36° C.; also shown is the time at which the corresponding sample from which the product was distilled was originally removed from the reaction mixture during the course of the reaction.

TABLE II

| Hours: | Wt. percent of dimethylchlorosilane |
|---|---|
| 0 | 86.8 |
| 8 | 89.1 |
| 12 | 91.9 |
| 30 | 96.8 |

Based on the above results shown in Tables I and II and the examples, one skilled in the art would know that the method of the present invention provides for the recovery of dimethylchlorosilane frem crude chlorosilane mixtures. The dimethylchlorosilane provided by the method of the present invention can be utilized in addition reactions to make valuable intermediates useful for making polymers and copolymers; such polymers and copolymers can be used in paintable organopolysiloxane applications, water repellent applications, etc.

While the foregoing examples have of necessity been limited to only a few of the very many variables within the scope of the present invention, it should be understood that the present invention is directed to the recovery of dimethylchlorosilane from a broad class of crude chlorosilane mixtures contaminated with hydrocarbons produced by the direct reaction of organic halides and powdered silicon in the presence of a copper catalyst.

What I claim as new and desire to secure by Letters Patent of the United States is:

1. A method which comprises (1) contacting chlorosilane having a hydrocarbon contaminant with anhydrous hydrogen chloride, to provide for the production of a mixture having at least 0.01 part of hydrogen chloride, per part of said chlorosilane (2) distilling the resulting mixture of (1) to provide for the recovery of chlorosilane having a boiling point between 34°–36° C. at atmospheric pressure free of said hydrocarbon contaminant, where said chlorosilane is the product of reaction of powdered silicon and methylchloride and comprises at least 10% by weight of dimethylchlorosilane, and said hydrocarbon contaminant is the result of free radical degradation during the reaction of powdered silicon and methyl chloride.

2. A method in accordance with claim 1, where the resulting mixture of (1) is distilled at a temperature to 41° C. at atmospheric pressure.

3. A method for recovering dimethylchlorosilane from a chlorosilane reaction product of methyl chloride and powdered silicon free of hydrocarbon contaminate resulting from free radical degradation comprising at least 10% by weight of chlorosilane of dimethylchlorosilane which comprises (1) mixing anhydrous hydrogen chloride and said chlorosilane reaction product at atmospheric pressure, (2) passing the resulting mixture of (1) into a condensation zone at a temperature between —20° C. to 30° C., (3) recovering from (2), the resulting condensate, (4) distilling the condensate of (3) at atmospheric pressure to a temperature up to 41° C., to provide for the recovery of a fraction boiling between 34° C. to 36° C. at atmospheric pressure.

4. A method for recovering dimethylchlorosilane from chlorosilane comprising a major amount of dimethylchlorosilane, and minor amounts of trichlorosilane, silane, methyldichlorosilane and hydrocarbon contaminant, which comprises (1) passing anhydrous hydrogen chloride into said chlorosilane to form a mixture at above atmospheric pressure having at least .01 part of hydrogen chloride per part of chlorosilane, (2) distilling the resulting mixture of (1) to a temperature up to 41° C., at atmospheric pressure and (3) recovering from the resulting distillate of (2) a product boiling between 34° C. to 36° C., at atmospheric pressure where said hydrocarbon contaminant is produced during the reaction between methyl chloride and powdered silicon as a result of free radical degradation.

References Cited

UNITED STATES PATENTS

| | | | |
|---|---|---|---|
| 2,563,557 | 8/1951 | Schubert et al. | 203—71 |
| 2,755,295 | 7/1956 | Gordon | 260—448 |

WILBUR L. BASCOMB, Jr., *Primary Examiner.*